US011122613B2

(12) United States Patent
Yang et al.

(10) Patent No.: US 11,122,613 B2
(45) Date of Patent: Sep. 14, 2021

(54) WIRELESS COMMUNICATION METHOD, TERMINAL DEVICE AND NETWORK DEVICE

(71) Applicant: GUANGDONG OPPO MOBILE TELECOMMUNICATIONS CORP., LTD., Guangdong (CN)

(72) Inventors: Ning Yang, Guangdong (CN); Hua Xu, Ottawa (CA)

(73) Assignee: GUANGDONG OPPO MOBILE TELECOMMUNICATIONS CORP., LTD., Guangdong (CN)

(*) Notice: Subject to any disclaimer, the term of this patent is extended or adjusted under 35 U.S.C. 154(b) by 89 days.

(21) Appl. No.: 16/537,164

(22) Filed: Aug. 9, 2019

(65) Prior Publication Data

US 2019/0364594 A1 Nov. 28, 2019

Related U.S. Application Data

(63) Continuation of application No. PCT/CN2017/073250, filed on Feb. 10, 2017.

(51) Int. Cl.
*H04W 72/14* (2009.01)
*H04W 72/12* (2009.01)

(52) U.S. Cl.
CPC ....... *H04W 72/14* (2013.01); *H04W 72/1284* (2013.01)

(58) Field of Classification Search
CPC ....................................... H04L 12/28
USPC ....................................... 370/400
See application file for complete search history.

(56) References Cited

U.S. PATENT DOCUMENTS

2019/0394790 A1* 12/2019 Damnjanovic ..... H04W 52/281

FOREIGN PATENT DOCUMENTS

| CN | 104168600 A | 11/2014 |
| CN | 104853385 A | 8/2015 |
| CN | 105960023 A | 9/2016 |
| EP | 2933959 A2 | 10/2015 |
| WO | 2016164465 A1 | 10/2016 |

(Continued)

OTHER PUBLICATIONS

Intel Corporation: "Grant-free UL transmissions in NR", R1-1609499; 3GPP; Mobile Competence Centre; 650, Route Des Lucioles; F-06921 Sophia-Antipolis Cedex; France; vol. RAN WG1, no. Lisbon, Portugal; Oct. 10, 2016-Oct. 14, 2016; Oct. 9, 2016; XP051149538.

(Continued)

*Primary Examiner* — Dang T Ton
(74) *Attorney, Agent, or Firm* — Ladas & Parry LLP

(57) ABSTRACT

Embodiments of the present application provide a wireless communication method, a terminal device and a network device capable of implementing contention-based access while avoiding conflicts. The method includes: transmitting, by a terminal device, a sounding signal to a network device when there is uplink data to be transmitted, where the sounding signal is used for contending for a first pre-allocated resource; and transmitting, by the terminal device, the uplink data to be transmitted on the first pre-allocated resource, when receiving a first feedback signal sent by the network device in response to the sounding signal, where the first feedback signal is used for indicate that the terminal device has a successful contention for the first pre-allocated resource.

26 Claims, 5 Drawing Sheets

(56) References Cited

FOREIGN PATENT DOCUMENTS

WO      2017165140 A1    9/2017
WO      2018031770 A1    2/2018

OTHER PUBLICATIONS

Extended European Search Report dated Dec. 20, 2019.
International Search Report (ISR) dated Nov. 15, 2017 for Application No. PCT/CN2017/073250.
The first Office Action of corresponding European application No. 17895583.7, dated Sep. 16, 2020.
The First Office Action of corresponding Chilean application No. 201902262, dated Sep. 30, 2020.
The second Office Action of corresponding European application No. 178955837, dated Mar. 29.2021.
The first Office Action of corresponding Indian application No. 201917035477, dated Apr. 15, 2021.
The first Office Action of corresponding Taiwan application No. 107103257, dated Apr. 16, 2021.
Lenovo et al.:" On Latency reduction for UL transmission", 3GPP Draft; R1-1702661_On Latency Reduction for UL Transmission Final, 3RD Generation Partnership Project (3GPP), Mobile Competence Centre; 650, Route Des Lucioles; F-06921 Sophia-Antipolis Cedex vol. Ran WG1, No. Athens, Greece; Feb. 13, 2017-Feb. 17, 2014 Feb. 6, 2017(Feb. 6, 2017). XP051220332.
The second Office Action of corresponding Chilean application No. 201902262, dated Jul. 5, 2021.

* cited by examiner

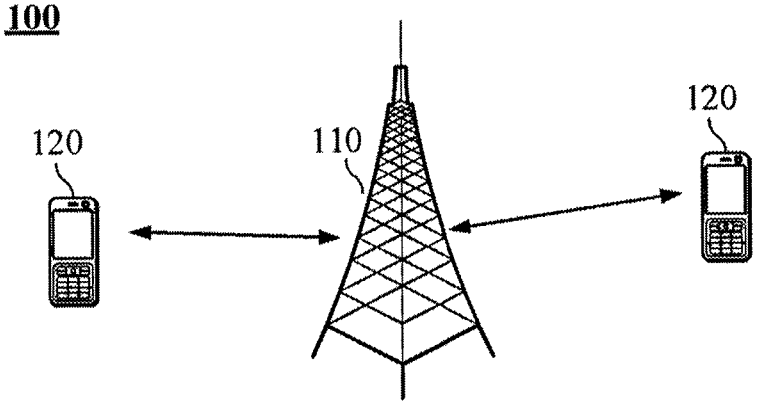

FIG. 1

A terminal device transmits a sounding signal to a network device when there is uplink data to be transmitted, where the sounding signal is used for contending for a first pre-allocated resource — 210

The terminal device transmits the uplink data to be transmitted on the first pre-allocated resource when receiving a first feedback signal sent by the network device in response to the sounding signal, where the first feedback signal is used for indicating that the terminal device has a successful contention for the first pre-allocated resource — 220

FIG. 2

WIRELESS COMMUNICATION METHOD, TERMINAL DEVICE AND NETWORK DEVICE

CROSS-REFERENCE TO RELATED APPLICATIONS

This application is a continuation of International Application No. PCT/CN2017/073250 filed on Feb. 10, 2017, the content of which is incorporated herein by reference in its entirety.

TECHNICAL FIELD

The present application relates to the field of communication and, more particularly, to a wireless communication method, a terminal device and a network device.

BACKGROUND

In a typical wireless communication network (e.g., long term evolution (LTE)), uplink shared data channels are selected based on a scheduling/grant mechanism that is under full control of a base station (BS). This mechanism begins from a user equipment (UE) transmitting an uplink scheduling request to the BS. Having received the request, the BS transmits an uplink grant to the UE, informing the UE about the uplink transmission resource allocated for the UE. According to this, the UE performs data transmission on the granted uplink transmission resource.

Large scale user access is one of the typical application scenarios for the next generation communication network. If the scheduling/grant mechanism continues when in massive user access, huge signaling transport overhead and pressure on the BS in scheduling the resource allocation will incur on the one hand, and significant transmission latency will be caused on the other hand. In view of these, the next generation communication network will adopt a contention-based access to support massive user access.

However, since the contention-based access allows for configuring semi-static resource for a group of terminal devices, conflicts will occur if more than one terminal device transmits data on the same resource at the same time. Thus, a solution is desired to solve the problem of avoiding conflicts in the contention-based access.

SUMMARY

Embodiments of the present application provide a wireless communication method, a terminal device and a network device capable of implementing contention-based access while avoiding conflicts.

A first aspect provides a wireless communication method, including:

transmitting, by a terminal device, a sounding signal to a network device when there is uplink data to be transmitted, wherein the sounding signal is used for contending for a first pre-allocated resource; and transmitting, by the terminal device, the uplink data to be transmitted on the first pre-allocated resource, when receiving a first feedback signal sent by the network device in response to the sounding signal, where the first feedback signal is used for indicating that the terminal device has a successful contention for the first pre-allocated resource.

In conjuncture with the first aspect, in a possible implementation of the first aspect, the method includes:

transmitting the uplink data to be transmitted on an uplink grant resource when the terminal device receives a second feedback signal sent by the network device in response to the sounding signal, where the second feedback signal is used for indicating the uplink grant resource which is different from the first pre-allocated resource.

In conjuncture with the first aspect or any one of the foregoing possible implementations, in another possible implementation of the first aspect, the method includes:

starting a timer after transmitting the sounding signal;

wherein the transmitting, by the terminal device, the uplink data to be transmitted on the first pre-allocated resource, when receiving a first feedback signal sent by the network device in response to the sounding signal comprises:

transmitting, by the terminal device, the uplink data to be transmitted on the first pre-allocated resource, when receiving the first feedback signal within a duration of the timer; and wherein the transmitting the uplink data to be transmitted on an uplink grant resource when the terminal device receives a second feedback signal sent by the network device in response to the sounding signal comprises:

transmitting the uplink data to be transmitted on the uplink grant resource when the terminal device receives the second feedback signal within the duration of the timer.

In conjuncture with the first aspect or any one of the foregoing possible implementations, in still another possible implementation of the first aspect, the method includes:

transmitting a sounding signal on a pre-allocated resource of a next cycle to contend for the first pre-allocated resource of the next cycle, when neither the first feedback signal nor the second feedback signal is received within the duration of the timer.

In conjuncture with the first aspect or any one of the foregoing possible implementations, in still another possible implementation of the first aspect, and before the terminal device transmits the sounding signal to the network device, the method includes at least one of:

generating the sounding signal according to identifier information of the terminal device; and determining the first pre-allocated resource according to the identifier information of the terminal device.

In conjuncture with the first aspect or any one of the foregoing possible implementations, in still another possible implementation of the first aspect, the transmitting, by a terminal device, a sounding signal to a network device includes:

transmitting, by the terminal device, the sounding signal on the second pre-allocated resource.

In conjuncture with the first aspect or any one of the foregoing possible implementations, in still another possible implementation of the first aspect, and before the terminal device transmits the sounding signal on the second pre-allocated resource, the method includes:

determining the first pre-allocated resource, which is used for transmitting the uplink data to be transmitted, among a first pre-allocated resource group, determining among the second pre-allocated resource group, by the terminal device, the second pre-allocated resource corresponding to the first pre-allocated resource according to the first pre-allocated resource and a corresponding relationship between resources in the first pre-allocated resource group and resources in a second pre-allocated resource group, which is used for indicating, via the second pre-allocated resource, that a resource to be contended for by the terminal device is the first pre-allocated resource.

In conjuncture with the first aspect or any one of the foregoing possible implementations, in still another possible implementation of the first aspect, and before the terminal device transmits the sounding signal on the second pre-allocated resource, the method includes:

determining, by the terminal device, the second pre-allocated resource among a second pre-allocated resource group according to identifier information of the terminal device.

In conjuncture with the first aspect or any one of the foregoing possible implementations, in still another possible implementation of the first aspect, the method includes:

receiving first indicating information, which is used for indicting allocation information of the second pre-allocated resource, so as for the terminal device to transmit the sounding signal on the second pre-allocated resource according to the second indicating information.

In conjuncture with the first aspect or any one of the foregoing possible implementations, in still another possible implementation of the first aspect, the allocation information of the second pre-allocated resource is used for indicating at least one of:

a resource location of the second pre-allocated resource;

a mapping relationship between identifier information of at least one terminal device and the second pre-allocated resource;

a transport format of the sounding signal; and a mapping relationship between a resource in a first pre-allocated resource group and a resource in a second pre-allocated resource group, wherein the resource in the first pre-allocated resource group is used for transferring uplink data, and the resource in the second pre-allocated resource group is used for transferring a sounding signal.

In conjuncture with the first aspect or any one of the foregoing possible implementations, in still another possible implementation of the first aspect, the sounding signal carries at least one of: a service type of a service to which the uplink data to be transmitted belongs, a data amount of the uplink data to be transmitted, and a part of data of the uplink data to be transmitted.

In conjuncture with the first aspect or any one of the foregoing possible implementations, in still another possible implementation of the first aspect, the method includes:

receiving second indicating information, which is used for indicting allocation information of the first pre-allocated resource, so as for the terminal device to perform at least one of: transmitting uplink data on the first pre-allocated resource and contending for the first pre-allocated resource according to the second indicating information.

In conjuncture with the first aspect or any one of the foregoing possible implementations, in still another possible implementation of the first aspect, the allocation information of the first pre-allocated resource is used for indicating at least one of:

a resource location of the first pre-allocated resource;

a transmission period of the first pre-allocated resource;

a transport format of data transferred on the first pre-allocated resource; and a mapping relationship between identifier information of at least one terminal device and the first pre-allocated resource.

In conjuncture with the first aspect or any one of the foregoing possible implementations, in still another possible implementation of the first aspect, the second indicating information carries a shared identifier, which is used for indicating that the first pre-allocated resource is a shared resource.

A second aspect provides a wireless communication method, including:

receiving, by a network device, a sounding signal sent by at least one terminal device, where the sounding signal is used for contending for a first pre-allocated resource;

determining, among the at least one terminal device, a first terminal device; and transmitting a first feedback signal to the first terminal device, wherein the first feedback signal is used for indicating that the terminal device has a successful contention for the first pre-allocated resource.

In conjuncture with the second aspect, and in a possible implementation of the second aspect, the method includes:

determining, among the at least one terminal device, a second terminal device;

allocating an uplink grant resource to the second terminal device; and transmitting a second feedback signal to the second terminal device, where the second feedback signal is used for indicating the uplink grant resource.

In conjuncture with the second aspect or any one of the foregoing possible implementations, in another possible implementation of the second aspect, the determining, among the at least one terminal device, a first terminal device includes:

determining, among the at least one terminal device, the first terminal device according to at least one of:

an order in which a sounding signal of the at least one terminal device is being received; a level of the at least one terminal device; a size of a data amount of the uplink data to be transmitted of the at least one terminal device; and a service type to which the uplink data to be transmitted of the at least one terminal device belongs.

In conjuncture with the second aspect or any one of the foregoing possible implementations, in another possible implementation of the second aspect, the method includes:

determining a terminal device to which the sounding signal belongs according to at least one of: a manner in which the sounding signal is generated and a resource bearing the sounding signal.

In conjuncture with the second aspect or any one of the foregoing possible implementations, in another possible implementation of the second aspect, the first pre-allocated resource belongs to a first pre-allocated resource group; and the receiving, by a network device, a sounding signal sent by at least one terminal device comprises:

receiving the sounding signal sent by at least one terminal device on a resource included in a second pre-allocated resource group.

In conjuncture with the second aspect or any one of the foregoing possible implementations, in another possible implementation of the second aspect, the method includes:

determining the first pre-allocated resource in the first pre-allocated resource group to be a resource being contended for by the at least one terminal device according to a resource on which each of the at least one terminal device transmits the sounding signal and a corresponding relationship between resources in a first allocated resource group and a second pre-allocated resource group.

In conjuncture with the second aspect or any one of the foregoing possible implementations, in another possible implementation of the second aspect, the method includes:

transmitting first indicating information, which is used for indicating allocation information of the second pre-allocated resource.

In conjuncture with the second aspect or any one of the foregoing possible implementations, in another possible implementation of the second aspect, the allocation information of the second pre-allocated resource is used for indicating at least one of:

a resource location of the second pre-allocated resource;

a mapping relationship between identifier information of a terminal device of a first terminal device set and the second pre-allocated resource;

a transport format of the sounding signal; and a mapping relationship between a resource in a first pre-allocated resource group and a resource in a second pre-allocated resource group, where the resource in the first pre-allocated resource group is used for transferring uplink data, and the resource in the second pre-allocated resource group is used for transferring a sounding signal.

In conjuncture with the second aspect or any one of the foregoing possible implementations, in another possible implementation of the second aspect, the sounding signal carries at least one of: a service type of a service to which the uplink data to be transmitted belongs, a data amount of the uplink data to be transmitted, and a part of data of the uplink data to be transmitted.

In conjuncture with the second aspect or any one of the foregoing possible implementations, in another possible implementation of the second aspect, the method includes:

transmitting second indicating information, which is used for indicating allocation information of the first pre-allocated resource.

In conjuncture with the second aspect or any one of the foregoing possible implementations, in another possible implementation of the second aspect, the allocation information of the first pre-allocated resource is used for indicating at least one of:

a resource location of the first pre-allocated resource;

a transmission period of the first pre-allocated resource;

a transport format of data transferred on the first pre-allocated resource; and a mapping relationship between identifier information of a terminal device of a first terminal device set and the first pre-allocated resource.

In conjuncture with the second aspect or any one of the foregoing possible implementations, in another possible implementation of the second aspect, the second indicating information carries a shared identifier, which is used for indicating that the first pre-allocated resource is a resource shared among the first terminal device set.

A third aspect provides a terminal device which may include units configured to implement the method in the foregoing first aspect or any one of the possible implementations thereof.

A fourth aspect provides a network device which may include units configured to implement the method in the foregoing second aspect or any one of the possible implementations thereof.

A fifth aspect provides a terminal device which may include a memory and a processor, where the memory stores instructions and the processor is configured to call the instructions in the memory to execute the method in the foregoing first aspect or any one of the optional implementations thereof.

A sixth aspect provides a network device which may include a memory and a processor, where the memory stores instructions and the memory is configured to call the instructions to execute the method in the foregoing second aspect or any one of the optional implementations thereof.

A seventh aspect provides a computer readable storage medium, storing program codes to be executed by a terminal device, the program codes including instructions used for executing the method in the first aspect or various implementations thereof, or the method in the second aspect or various implementations thereof.

An eighth aspect provides a system-on-chip which includes an input interface, an output interface, a processor and a memory, the processor is configured to execute codes in the memory, where the processor may, when the codes are being executed, implement the method in the first aspect or various implementations thereof, or the method in the second aspect or various implementations thereof.

Accordingly, in embodiments of the present application, when there is uplink data to be transmitted, a terminal device transmits to a network device a sounding signal used for contending for a first pre-allocated resource, and when the terminal device receives from the network device a first feedback signal for indicating that the terminal device is successful in contending for the first pre-allocated resource, the terminal device transmits the uplink data to be transmitted on the first pre-allocated resource, which may avoid conflict in resource contention.

DRAWINGS

In order to more clearly illustrate the technical solutions in the embodiments of the present application, the drawings required in describing the embodiments or the prior art will be briefly introduced below. Apparently, the drawings described in the following are only for some embodiments of the present application, and other drawings can be obtained by those skilled in the art without paying any creative effort.

FIG. 1 is a schematic diagram of a communication system according to an embodiment of the present application.

FIG. 2 is a schematic flowchart of a wireless communication method according to an embodiment of the present application.

DESCRIPTION OF EMBODIMENTS

Figure 3:
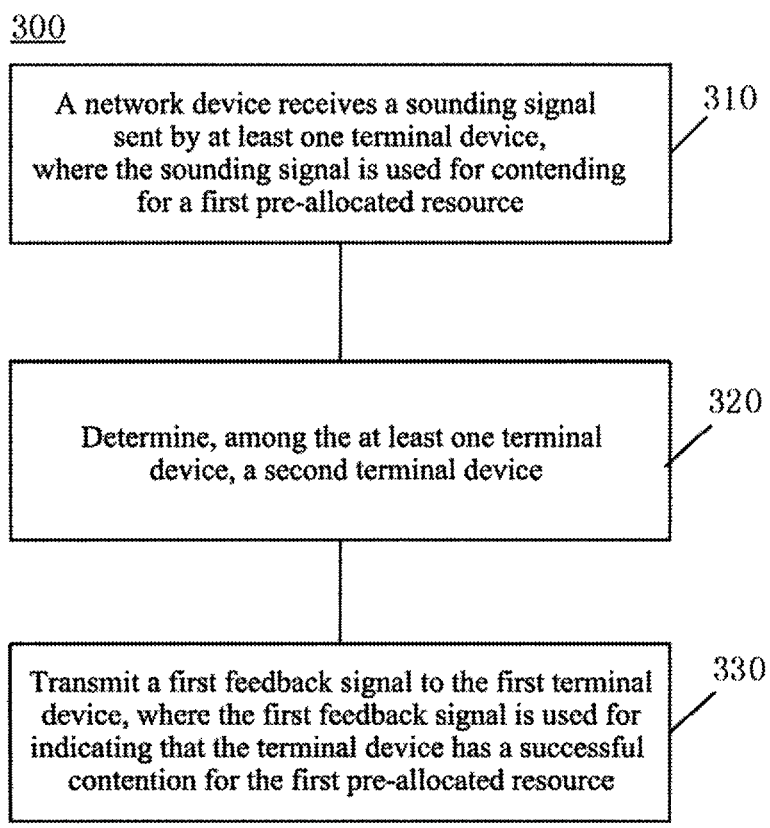
FIG. 3 is a schematic flowchart of a wireless communication system according to an embodiment of the present application.

Now, the technical solutions in the embodiments of the present application will be described hereunder with reference to accompanying drawings. Obviously, the described embodiments are a part of embodiments of the present application, rather than all of them. Based on the embodiments of the present application, all other embodiments obtained by persons of ordinary skill in the art without making any creative effort shall fall within the protection scope of the present application.

As used herein, the terms "component", "module", "system" or the like are intended to represent a computer related entity, hardware, firmware, combination of hardware and software, software or software being executed. For instance, a "component" may be, but not limited to, a process running on a processor, a processor, an object, an executable file, an execution thread, a program and/or a computer. As depicted herein, an application running on a computing device and the computing device may both be a component. One or more components may reside in a process and/or execution thread. A component may be located on one computer and/or distributed across two or more computers. Moreover, these components may be executed from various computer readable media storing thereon various data structures. A component may communicate via a local and/or remote process according to, e.g., a signal having one or more data packets (e.g., data from a second component that interact with a local system, a distributed system and/or another component in a network, e.g., an interconnected network that interacts with other systems via a signal).

The present application proposes a solution for contention-based access. The contention-based access may fulfill service transmission with low latency and high reliability. A contention-based access transmission may be oriented towards uplink data transmission. Those skilled may know that contention-based access transmission may be referred to by other terms, such as spontaneous access or grant free transmission or the like. The contention-based access may be understood to mean any one or more of, or a combination of some technical features of, the following.

1. The contention-based access may be referring to: a network device pre-allocates transmission resources and inform a terminal device of the same; the terminal device selects at least one of the transmission resources that have been pre-allocated by the network device when the terminal device has uplink data that needs to be transmitted, and uses the selected transmission resource to transmit the uplink data; and the network device detects the uplink data sent by the terminal device on one or more of the pre-allocated transmission resources. The detection may be done by blind detection, or according to a particular control domain in the uplink data, or by other means.

2. The contention-based access may be referring to: a network device pre-allocates transmission resources and inform a terminal device of the same, causing the terminal device to select at least one of the transmission resources that have been pre-allocated by the network device when the terminal device has uplink data that needs to be transmitted, and uses the selected transmission resource to transmit the uplink data.

3. The contention-based access may be referring to: acquiring information of a plurality of pre-allocated transmission resources; selecting at least one of the transmission resources when there is uplink data that needs to be transmitted; and using the selected transmission resource to transmit the uplink data. A specific manner for the acquiring may be acquired from a network device.

4. The contention-based access may be referring to: a method that enables uplink data transmission for a terminal device without the need for dynamic scheduling by a network device, where the dynamic scheduling may be referring to a scheduling style in which the network device indicates, via signaling, a transmission resource for each uplink data transmission of a terminal device. In an implementation, to enable uplink data transmission for a terminal device may be understood as allowing data from two or more terminal devices to engage in uplink data transmission on a same time-frequency resource. In an implementation, the transmission resource may be a transmission resource of one or more transmission time units following the moment when a UE receives the signaling. A transmission time unit may be the minimum time unit for one transmission, such as transmission time interval (TTI), whose value may be 1 millisecond (ms), or it may be a predefined transmission time unit.

5. The contention-based access may be referring to: a terminal device transmits uplink data without the need for a grant from a network device. The grant may be referring to: the terminal device transmits an uplink scheduling request to the network device which, after receiving the scheduling request, transmits an uplink grant to the terminal device, where the uplink grant indicates an uplink transmission resource allocated to the terminal device.

6. The contention-based access may be referring to: an approach for contentious transmission and, in particular, to multiple terminals transmitting uplink data simultaneously on a same time-frequency resource that has been pre-allocated without any need for a grant from a base station.

The data may include service data or signaling data.

The blind detection may be understood as detecting for data that may arrive without pre-knowing whether any data may arrive. Alternatively, the blind detection may be understood as detection without indication from any explicit signaling.

The transmission resource may include, but not limited to, one or a combination of more of the following resources: a time domain resource, such as a radio frame, a sub-frame, a symbol, etc.; a frequency domain resource, such as a sub-carrier, a resource block (RB), etc.; a spatial domain resource, such as a transmitting antenna, a beam, etc.; a code domain resource, such as a sparse code multiple access (SCMA) codebook group, a low density signature (LDS) group, a CDMA code group, etc.; an uplink pilot resource.

The foregoing transmission resources may include, but not limited to, transmissions done in the following control mechanisms: uplink power control, such as control of the maximum uplink transmission power, etc.; modulation and encoding scheme configuration, such as size of a transmission block, code rate, modulation level configuration, etc.; a retransmission mechanism, such as HARQ (hybrid automatic repeat request) mechanism, etc.

FIG. 1 illustrates a radio communication system 100 in which an embodiment of the present application is applied. The radio communication system 100 may include a network device 110. The network device 110 may be any device in communication with a terminal device. The network device 100 may provide communication coverage for a specific geographical region, and may communicate with a terminal device (e.g., a UE) within the coverage region. In an implementation, the network device 100 may be a base transceiver station (BTS) as in a GSM system or CDMA system, or a NodeB (NB) as in a WCDMA system, or an Evolutional Node B (eNB, or eNodeB) as in the LTE system, or a radio controller as in the cloud radio access network (CRAN). Alternatively, the network device may be a relay station, an access point (AP), a vehicle-mounted device, a wearable device, a network side device as in the future 5G network, or a network device as in the next evolution of public land mobile network (PLMN).

The radio communication system 100 also includes at least one terminal device 120 located within the coverage of the network device 110. The terminal device 120 may be mobile or stationary. In an implementation, a terminal device 120 may refer to an access terminal, a user equipment (UE), a subscriber unit, a subscriber station, a mobile station, a mobile station, a remote station, a remote terminal, a mobile device, a user terminal, a terminal, a radio communication device, a user agent or a user device. The access terminal may be a cellular phone, a cordless phone, a session initiation protocol (SIP) phone, a wireless local loop (WLL) station, a personal digital assistant (PDA), a handset with radio communication capability, a computing device, or other processing device, vehicle-mounted device or wearable device that has connection to a wireless modem, or a network side device as in the future 5G network, or a network device as in the next evolution of PLMN.

In an implementation, different terminal devices 120 may perform device to device (D2D) communication.

In an implementation, the 5G system or network may also be referred to as new radio (NR) system or network.

FIG. 1 illustratively shows one network device and two terminal devices. In an implementation, the wireless communication system 100 may include a plurality of network devices, and each network device may cover other quantities of terminal devices, which will not be limited in embodiments of the present application.

In an implementation, the wireless communication system 100 may also include a network controller, a mobility management entity and/or other network entities, which will not be limited in embodiments of the present application.

It should be understood that, as used herein, the terms "system" and "network" may be used interchangeably. As used herein, the term "and/or" merely describes a relation between related objects, representing three possible relations. For instance, "A and/or B" may represent three cases: A alone, A and B together, and B alone. Additionally, as used herein, the symbol "/" typically means the related objects before and after the symbol are in a "or" relation.

For the purpose of a clearer understanding of the present application, solutions according to embodiments of the present application will now be described in connection with FIGS. 2 to 7.

FIG. 2 is a schematic flowchart of a wireless communication method 200 according to an embodiment of the present application. The method 200 may be applied to the communication system 100 as shown in FIG. 1. As shown in FIG. 2, the method 200 includes the following.

At 210, a terminal device transmits a sounding signal to a network device when there is uplink data to be transmitted, where the sounding signal is used for contending for a first pre-allocated resource.

In an embodiment of the present application, the terminal device transmits the sounding signal on a second pre-allocated resource.

Specifically, the network device may pre-allocate a group of resources (i.e., a second pre-allocated resource group) for at least one terminal device, which is used for the at least one terminal device to transmit the sounding signal. The terminal device may employ various approaches in making the selection among the group of resources pre-allocated by the network device to transmit the sounding signal.

In an implementation, the terminal device determines the second pre-allocated resource among the second pre-allocated resource group according to identifier (ID) information of the terminal device.

For instance, the terminal device may determine a second pre-allocated resource out of the second pre-allocated resource group according to a corresponding relationship between pre-allocated identifier information and resources in the resource group, as well as the identifier information of the terminal device.

Specifically, the terminal device may apply modulo operation to the ID of the terminal device to derive a transmission unit in time domain. Or, the terminal device may apply modulo operation to the ID of the terminal device to derive a transmission sub-band in frequency domain. Or, the terminal device may apply modulo operation to the ID of the terminal device to derive a transmission resource in code domain.

For another instance, the terminal device may process the identifier information of the terminal device (e.g., perform a modulo operation), and then select the second pre-allocated resource according to the resultant value and a corresponding relation between values and resources in the second pre-allocated resource group.

In this implementation, the network device may infer from the second pre-allocated resource, on which the sounding signal is received, which terminal device had transmitted the sounding signal. In an implementation, the terminal device may choose not to carry in the sounding signal the identifier information of the terminal device.

In another implementation, the first pre-allocated resource for transmitting the uplink data to be transmitted is determined among a first pre-allocated resource group. The terminal device determines, according to the first pre-allocated resource and a corresponding relationship between resources in the first pre-allocated resource group and resources in a second pre-allocated resource group, the second pre-allocated resource, which corresponds to the first pre-allocated resource, among the second pre-allocated resource group, which is used for indicating, via the second pre-allocated resource, that a resource to be contended for by the terminal device is the first pre-allocated resource.

According to this approach, the network device can know the pre-allocated resource that a terminal device intends to contend for after receiving the sounding signal transmitted on the second pre-allocated resource.

It should be understood that, in an embodiment of the present application, a terminal device may also use other means to inform a network device of the pre-allocated resource that the terminal device intends to contend for.

It should also be understood that, in an embodiment of the present application, a terminal device may, alternatively, choose not to inform the network device of a specific pre-allocated resource that the terminal device intends to contend for. That is, the network device may pre-allocate a first pre-allocated resource for at least one terminal device, so that the network device may know the resource that a terminal device needs to contend for by simply deriving the identifier information of the terminal device according to the sounding signal.

In an embodiment of the present application, a sounding signal may be generated according to identifier information of a terminal device, so that a network device may infer the terminal device that had transmitted the sounding signal after receiving the same.

In an embodiment of the present application, the sounding signal may simply carry an identifier (ID) of the terminal device.

In an embodiment of the present application, a terminal device may determine the first pre-allocated resource according to the identifier information of the terminal device.

In an implementation, the identifier information of terminal device as mentioned in this embodiment of the present application may be referring to the ID, the modular of the ID, or other information related to the ID, of the terminal device.

In an embodiment of the present application, the sounding signal may also carry at least one of: a service type of a service to which the uplink data to be transmitted belongs, and a data amount of the uplink data to be transmitted, so that the network device may, after receiving the sounding signal and according to at least one of the service type of the service to which the uplink data to be transmitted belongs and the data amount of the uplink data to be transmitted, determine whether to determine the first pre-allocated resource to be a resource for the terminal device to use, and whether there is a need to indicate some other uplink grant resource to the terminal device.

In an embodiment of the present application, a sounding signal may also carry a part of data of the uplink data to be transmitted in order to conserve resource.

In an embodiment of the present application, a terminal device may transmit sounding signals with respect to pre-allocated resources in various dimensions. Individual sounding signals may be transmitted with respect to code domain resource, time domain resource, spatial domain resource and frequency domain resource, respectively. Or, a sounding signal may be transmitted with respect to some of the code domain resource, time domain resource, spatial domain resource and frequency domain resource, while another sounding signal is transmitted with respect to some others thereof.

At 220, the terminal device transmits the uplink data to be transmitted on the first pre-allocated resource when receiving a first feedback signal sent by the network device in response to the sounding signal, where the first feedback signal is used for indicating that the terminal device has a successful contention for the first pre-allocated resource.

In an implementation, the terminal device transmits the uplink data to be transmitted on an uplink grant resource when the terminal device receives a second feedback signal sent by the network device in response to the sounding signal, where the second feedback signal is used for indicating the uplink grant resource which is different from the first pre-allocated resource.

In an embodiment of the present application, a terminal device may start a timer, and transmit the uplink data to be transmitted on the first pre-allocated resource when receiving the first feedback signal within a duration of the timer. If, however, no first feedback signal is received within the duration of the timer, a sounding signal will be transmitted on a pre-allocated resource during a next cycle to contend for the first pre-allocated resource of the next cycle.

In an embodiment of the present application, a terminal device may start a timer, and transmit the uplink data to be transmitted on the uplink grant resource when the terminal device receives the second feedback signal within a duration of the timer. A sounding signal will be transmitted on a pre-allocated resource during a next cycle to contend for the first pre-allocated resource of the next cycle.

In an embodiment of the present application, a terminal device may start a timer, and transmit the uplink data to be transmitted on the first pre-allocated resource when receiving the first feedback signal within a duration of the timer; or transmit the uplink data to be transmitted on the uplink grant resource when the terminal device receives the second feedback signal within the duration of the timer. If, however, neither the first nor the second feedback signal is received within the duration of the timer, a sounding signal will be transmitted on a pre-allocated resource during a next cycle to contend for the first pre-allocated resource of the next cycle.

In an embodiment of the present application, a network device may transmit first indicating information, which is used for indicating allocation information of the second pre-allocated resource. Thus, after receiving the first indicating information, the terminal device may transmit the sounding signal on the second pre-allocated resource according to the first indicating information.

In an implementation, the allocation information of the second pre-allocated resource is used for indicating at least one of:

a resource location of the second pre-allocated resource;

a mapping relationship between identifier information of at least one terminal device and the second pre-allocated resource;

a transport format of the sounding signal; and a mapping relationship between a resource in a first pre-allocated resource group and a resource in a second pre-allocated resource group, where the resource in the first pre-allocated resource group is used for transferring uplink data, and the resource in the second pre-allocated resource group is used for transferring a sounding signal.

It should be understood that, the mapping relationship between the identifier information of at least one terminal device and the second pre-allocated resource may be used for indicating at least one terminal device that may transmit the sounding signal on the second pre-allocated resource, and may, in particular, be a mapping relationship between of a modular result of the ID of the terminal device and the second pre-allocated resource.

In an implementation, the first indicating information also carries a shared identifier that is used for indicating that the first pre-allocated resource is a shared resource. For instance, SHARING-GRANT-RNTI may be carried. The RNTI stands for radio network temporary.

In an embodiment of the present application, the first indicating information may be transmitted via high level signaling or broadcast signaling. For instance, for a terminal device in RRC (radio resource control) connected status, it may be transmitted via high level signaling, while for a terminal device in RRC idle status, it may be transmitted via broadcast signaling.

In an embodiment of the present application, a network device may transmit second indicating information, which is used for indicating allocation information of the first pre-allocated resource. Thus, after receiving the second indicating information, the terminal device may perform at least one of: transmitting uplink data on the first pre-allocated resource and contending for the first pre-allocated resource, according to the second indicating information.

In an implementation, the allocation information of the first pre-allocated resource is used for indicating at least one of:

a resource location of the first pre-allocated resource;

a transmission period of the first pre-allocated resource;

a transport format of data transferred on the first pre-allocated resource; and a mapping relationship between identifier information of at least one terminal device and the first pre-allocated resource.

It should be understood that, the mapping relationship between the identifier information of the at least one terminal device and the first pre-allocated resource may be used for indicating at least one terminal device that may contend for the first pre-allocated resource, and may, in particular, be the mapping relationship between a modular result of the ID of the terminal device and the first pre-allocated resource.

In an implementation, the second indicating information also carries a first shared identifier that is used for indicating that the first pre-allocated resource is a shared resource. For instance, SHARING-GRANT-RNTI may be carried. The RNTI stands for radio network temporary.

In an embodiment of the present application, the second indicating information may be transmitted via high level signaling or broadcast signaling. For instance, for a terminal device in RRC connected status, it may be transmitted via high level signaling, while for a terminal device in RRC idle status, it may be transmitted via broadcast signaling.

In an implementation, a terminal device may, after receiving indicating information used for indicating a pre-allocated resource (i.e., the aforementioned first pre-allocated resource or second pre-allocated resource), transmit an Acknowledge (ACK) message. After receiving the ACK message, a network device may, according to the received ACK message, selectively adjust link adaptation parameters, e.g., transmit power, modulation and demodulation scheme and coding rate, for the terminal device.

In an implementation, the first pre-allocated resource and second pre-allocated resource may be resources continuous or discontinuous in time domain, where the first pre-allocated resource is later than the second pre-allocated resource.

In an implementation, the first pre-allocated resource and second pre-allocated resource may occupy the same sub-carrier or different sub-carriers.

FIG. 3 is a schematic flowchart of a wireless communication method 300 according to an embodiment of the present application. As shown in FIG. 3, the method 300 includes the following.

At 310, a network device receives a sounding signal sent by at least one terminal device, where the sounding signal is used for contending for a first pre-allocated resource.

In an embodiment of the present application, the sounding signal may carry at least one of: a service type of a service to which the uplink data to be transmitted belongs, a data amount of the uplink data to be transmitted, and a part of data of the uplink data to be transmitted.

At 320, determine, among the at least one terminal device, a first terminal device.

In an implementation, the network device may determine, among the at least one terminal device, a first terminal device according to at least one of:

an order in which a sounding signal of the at least one terminal device is being received; a level of the at least one terminal device; a size of a data amount of the uplink data to be transmitted of the at least one terminal device; and a service type to which the uplink data to be transmitted of the at least one terminal device belongs.

For instance, if a first pre-allocated resource only allows for data transmission of 4 terminal devices while the network device receives sounding signals from 10 terminal devices, the network device may determine, according to the transmission order of the 10 terminal devices, 4 terminal devices out of the 10 terminal devices, e.g., terminal devices whose sounding signals are received first, where the 4 terminal devices may use the first pre-allocated resource for uplink data transmission.

For instance, if a first pre-allocated resource only supports a fixed data amount, the network device may determine, according to the data amount carried in the sounding signals of individual terminal devices, that the first pre-allocated resource can be used for uplink data transmission, where a total data amount of transmissions of all the terminals using the pre-allocated resource is less than the data amount supported by the first pre-allocated resource.

For instance, if a first pre-allocated resource only allows for data transmission of 4 terminal devices while a network device receives sounding signals from 10 terminal devices, the network device may determine 4 terminal devices out of the 10 terminal devices according to their terminal levels, e.g., terminal devices in top terminal levels, where the 4 terminal devices may use the first pre-allocated resource for uplink data transmission.

For instance, if a first pre-allocated resource only allows for data transmission of 4 terminal devices while a network device receives sounding signals from 10 terminal devices, the network device may determine 4 terminal devices out of the 10 terminal devices according to service classes carried in their sounding signals, e.g., terminal devices whose uplink data to be transmitted belong to the top service classes, where the 4 terminal devices may use the first pre-allocated resource for uplink data transmission.

At 330, transmit a first feedback signal to the first terminal device, where the first feedback signal is used for indicating that the terminal device has a successful contention for the first pre-allocated resource.

In an embodiment of the present application, the network device may determine a second terminal device out of the at least one terminal device, allocate an uplink grant resource to the second terminal device, and transmit a second feedback signal to the second terminal device, where the second feedback signal is used for indicating the uplink grant resource.

In an embodiment of the present application, the network device may determine, among the at least one terminal device, the second terminal device according to at least one of:

an order in which a sounding signal of the at least one terminal device is being received; a level of the at least one terminal device; a size of a data amount of the uplink data to be transmitted of the at least one terminal device; and a service type to which the uplink data to be transmitted of the at least one terminal device belongs.

In an implementation, the second terminal device may need to transmit uplink data whose service type is above that of the first terminal device, and/or the second terminal device may have a terminal level above that of the first terminal device, thus allowing the terminal device with higher service class and/or terminal level to transmit its uplink data on the uplink grant resource, thereby enhancing stability and reliability for the transmission.

In an embodiment of the present application, a network device may identify a terminal device to which a sounding signal belongs according to at least one of: a manner the sounding signal is generated and a resource bearing the sounding signal.

In an embodiment of the present application, the first pre-allocated resource belongs to a first pre-allocated resource group, and a sounding signal sent by at least one terminal device is received on a resource included in a second pre-allocated resource group.

In an embodiment of the present application, the network device may determine the pre-allocated resource in a first pre-allocated resource group to be the resource being contended for by the at least one terminal device according to the resource of the sounding signal of each of the at least one terminal device and a corresponding relationship between resources in a first allocated resource group and a second pre-allocated resource group.

In an embodiment of the present application, a network device may transmit first indicating information, which is used for indicating allocation information of a second pre-allocated resource, for the at least one terminal device to transmit a sounding signal on the second pre-allocated resource according to the first indicating information.

In an implementation, the allocation information of the second pre-allocated resource is used for indicating at least one of:

a resource location of the second pre-allocated resource;

a mapping relationship between identifier information of at least one terminal device and the second pre-allocated resource;

a transport format of the sounding signal; and a mapping relationship between a resource in the first pre-allocated resource group and a resource in the second pre-allocated resource group, where the resource in the first pre-allocated resource group is used for transferring uplink data, and the resource in the second pre-allocated resource group is used for transferring a sounding signal.

In an embodiment of the present application, the network device may also transmit second indicating information, which is used for indicating allocation information of the first pre-allocated resource, for the at least one terminal device to transmit uplink data on the first pre-allocated resource according to the second indicating information.

In an implementation, the allocation information of the first pre-allocated resource is used for indicating at least one of:

a resource location of the first pre-allocated resource;

a transmission period of the first pre-allocated resource;

a transport format of data transferred on the first pre-allocated resource; and a mapping relationship between identifier information of the at least one terminal device and the first pre-allocated resource.

In an implementation, the second indicating information carries a shared identifier, which is used for indicating that the first pre-allocated resource is a resource shared among multiple terminal devices.

Accordingly, in embodiments of the present application, when there is uplink data to be transmitted, a terminal device transmits to a network device a sounding signal used for contending for a first pre-allocated resource. When the terminal device receives from the network device a first feedback signal for an indication that the terminal device is successful in contending for the first pre-allocated resource, the terminal device transmits the uplink data to be transmitted on the first pre-allocated resource, which may avoid conflict in resource contention.

Figure 4:
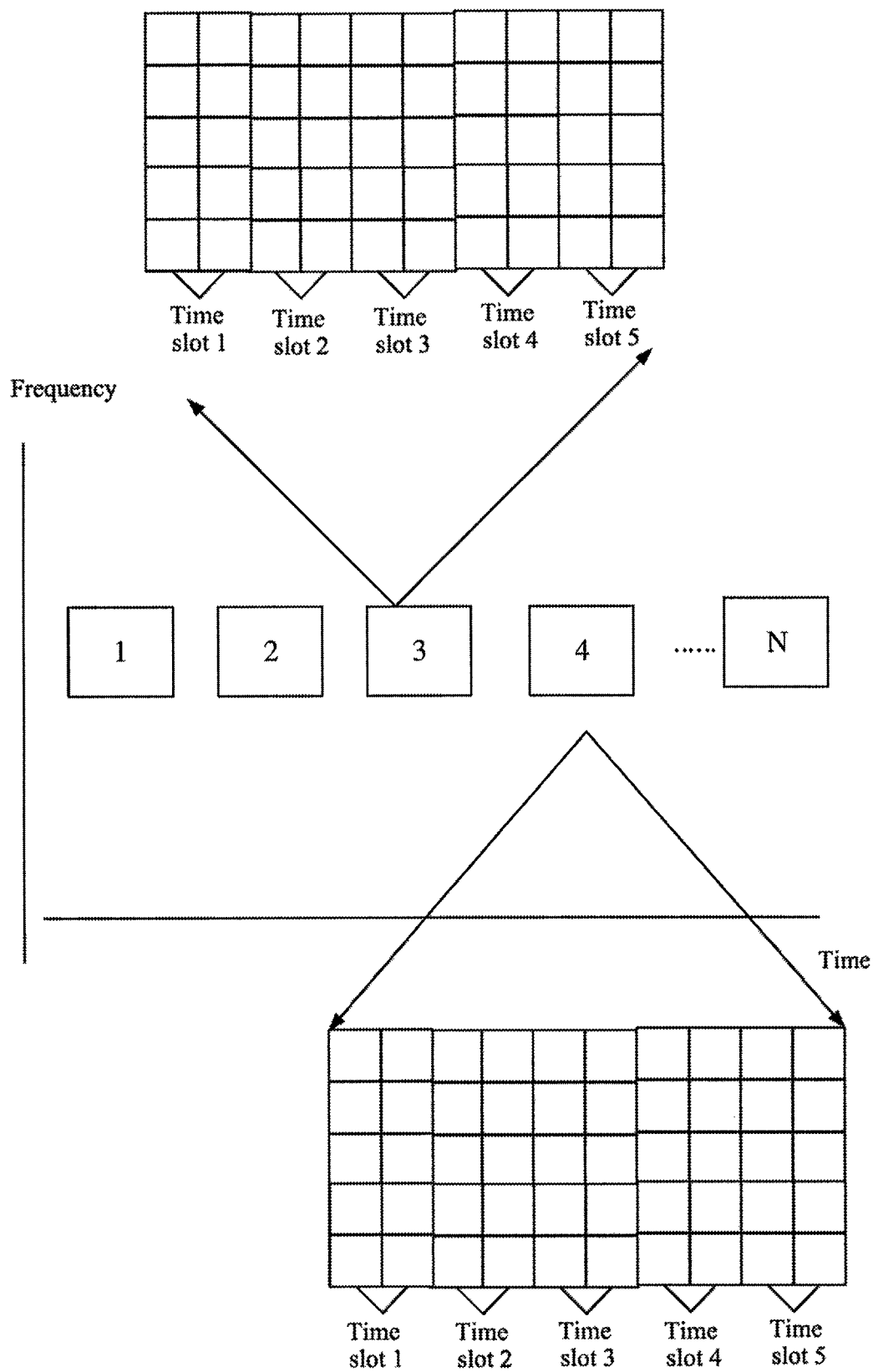
FIG. 4 is a schematic diagram of an allocation of a pre-allocated resource according to an embodiment of the present application.

For the purpose of a clearer understanding of the present application, a communication method according to embodiments of the present application will now be described in connection with FIG. 4 and Table 1.

The network has uplink contention resources semi-statically allocated to a group of UEs. For instance, as shown in FIG. 4, an uplink resource 3 and an uplink resource 4 are semi-statically allocated to a group of UEs (i.e., UE1, UE2, UE3, ..., UE7) by the network, where the uplink resource 3 is used by the group of UEs for transmitting sounding signals, and the uplink resource 4 is used by the group of UEs for transmitting uplink data. After corresponding allocation information has been received, respectively, the seven UEs would transmit their sounding signals on the semi-statically allocated resource 3 to contend for resources in the semi-static resource 4. (It should be understood that, not all UEs have data to be transmitted on time-frequency resources of resource 4. If no data is pending, nor would any sounding signal have to be transmitted on the resource 3.) Firstly, a UE who has data to be transmitted follows a pre-allocation policy, e.g., applying modular operation of UE ID, to derive a transmission time slot for the UE on the resource 3. The time slots for sounding signals and time slots for the contentions of different UEs according to such a policy may be as shown in Table 1. Secondly, the UE transmits the sounding signal on the determined time slot. The UE ID is included therein for the purpose of enabling the network to differentiate a case in which multiple UE transmissions are allocated on a same time slot. (For instance, both UE 1 and UE 6 may transmit their sounding signals on Slot 1). Thirdly, the UE that has transmitted the sounding signal triggers a timer to monitor a feedback signal from the network side in response to the sounding signal for a specified time duration. A UE who successfully receives the feedback signal succeeds in the contention.

TABLE 1

| UE ID | Time slot for the sounding signal | Time slot contended for |
|---|---|---|
| 1 | Slot 1 | Slot 1 |
| 2 | Slot 2 | Slot 2 |
| 3 | Slot 3 | Slot 3 |
| 4 | Slot 4 | Slot 4 |
| 5 | Slot 5 | Slot 5 |
| 6 | Slot 1 | Slot 1 |
| 7 | Slot 2 | Slot 2 |

It should be understood that, the above embodiment has been described in connection with FIG. 4 and Table 1 for the sole purpose of providing the reader with a better understanding of the present application, and should not be construed as specific limitations on the scope of the embodiment of the present application.

For instance, the resource 3 and resource 4 may be continuous in time domain, and the resource 3 is ahead of the resource 4 in time domain.

For another instance, the resource 4 and the resource 3 may have different number of time slots, the specifics of which may be allocated by the network device as practically needed.

For another instance, the resource 4 and the resource 3 may occupy different sub-bands.

Accordingly, in embodiments of the present application, when there is uplink data to be transmitted, a terminal device transmits to a network device a sounding signal for contending for a first pre-allocated resource. When the terminal device receives from the network device a first feedback signal for indicating that the terminal device is successful in contending for the first pre-allocated resource, the terminal device transmits the uplink data to be transmitted on the first pre-allocated resource, which may avoid conflict in resource contention.

Figure 5:
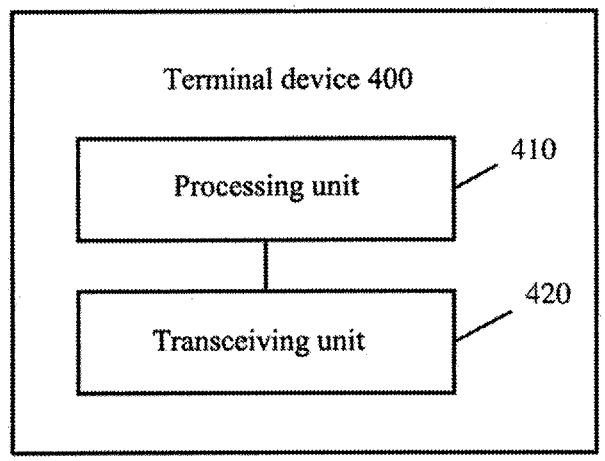
FIG. 5 is a schematic block diagram of a terminal device according to an embodiment of the present application.

FIG. 5 is a schematic block diagram of a terminal device 400 according to an embodiment of the present application. As shown in FIG. 5, the terminal device 400 includes a processing unit 410 and a transceiving unit 420, where:

the processing unit 410 is configured to generate a sounding signal when there is uplink data to be transmitted, where the sounding signal is used for contending for a first pre-allocated resource; and the transceiving unit 420 is configured to: transmit the sounding signal; and transmit the uplink data to be transmitted on the first pre-allocated resource when a first feedback signal, which is sent by the network device in response to the sounding signal, is received, wherein the first feedback signal is used for indicating that the terminal device has a successful contention for the first pre-allocated resource.

In an implementation, the transceiving unit 420 is configured to:

transmit the uplink data to be transmitted on an uplink grant resource when a second feedback signal, which is sent by the network device in response to the sounding signal, is received, where the second feedback signal is used for indicating the uplink grant resource which is different from the first pre-allocated resource.

In an implementation, the transceiving unit 420 is configured to:

start a timer after transmitting the sounding signal;

transmit the uplink data to be transmitted on the first pre-allocated resource when the first feedback signal is received within a duration of the timer; and transmit the uplink data to be transmitted on the uplink grant resource when the second feedback signal is received within the duration of the timer.

In an implementation, the transceiving unit 420 is configured to:

transmit a sounding signal on a pre-allocated resource of a next cycle to contend for the first pre-allocated resource of the next cycle, when neither the first feedback signal nor the second feedback signal is received within the duration of the timer.

In an implementation, the processing unit 410 is configured to perform at least one of:

generating the sounding signal according to identifier information of the terminal device; and determining the first pre-allocated resource according to the identifier information of the terminal device.

In an implementation, the transceiving unit 420 is configured to:

transmit the sounding signal on the second pre-allocated resource.

In an implementation, the processing unit 410 is configured to:

determine the first pre-allocated resource for transmitting the uplink data to be transmitted among a first pre-allocated resource group; and determine among the second pre-allocated resource group a second pre-allocated resource corresponding to the first pre-allocated resource according to the first pre-allocated resource and a relationship between resources in the first pre-allocated resource group and resources in a second pre-allocated resource group, which is used for indicating, via the second pre-allocated resource, that a resource to be contended for by the terminal device is the first pre-allocated resource.

In an implementation, the processing unit 410 is configured to:

determine, by the terminal device, the second pre-allocated resource among a second pre-allocated resource group according to identifier information of the terminal device.

In an implementation, the transceiving unit 420 is configured to:

receive first indicating information, which is used for indicting allocation information of the second pre-allocated resource, so as for the terminal device to transmit the sounding signal on the second pre-allocated resource according to the first indicating information.

In an implementation, the allocation information of the second pre-allocated resource is used for indicating at least one of:

a resource location of the second pre-allocated resource;

a mapping relationship between identifier information of the at least one terminal device and the second pre-allocated resource;

a transport format of the sounding signal; and a mapping relationship between a resource in a first pre-allocated resource group and a resource in a second pre-allocated resource group, where the resource in the first pre-allocated resource group is used for transferring uplink data, and the resource in the second pre-allocated resource group is used for transferring a sounding signal.

In an implementation, the sounding signal carries at least one of: a service type of a service to which the uplink data to be transmitted belongs, a data amount of the uplink data to be transmitted, and a part of data of the uplink data to be transmitted.

In an implementation, the transceiving unit 420 is configured to:

receive second indicating information, which is used for indicting allocation information of the first pre-allocated resource, so as for the terminal device to perform at least one of: transmitting uplink data on the first pre-allocated resource and contending for the first pre-allocated resource according to the second indicating information.

In an implementation, the allocation information of the first pre-allocated resource is used for indicating at least one of:

a resource location of the first pre-allocated resource;

a transmission period of the first pre-allocated resource;

a transport format of data transferred on the first pre-allocated resource; and a mapping relationship between identifier information of at least one terminal device and the first pre-allocated resource.

In an implementation, the second indicating information carries a shared identifier, which is used for indicating that the first pre-allocated resource is a shared resource.

It should be understood that, the terminal device 400 may correspond to, and may implement corresponding functions in, the terminal device in the method 200, which will not be repeated herein for the sake of brevity.

Figure 6:
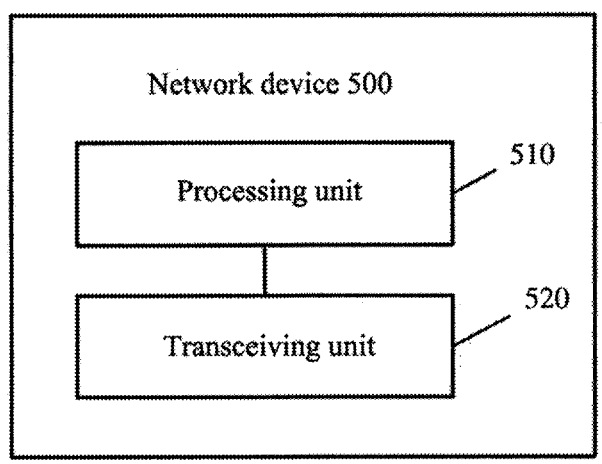
FIG. 6 is a schematic block diagram of a network device according to an embodiment of the present application.

FIG. 6 is a schematic block diagram of a network device 500 according to an embodiment of the present application. As shown in FIG. 6, the network device 500 includes a processing unit 510 and a transceiving unit 520, where:

the transceiving unit 520 is configured to receive a sounding signal sent by at least one terminal device, where the sounding signal is used for contending for a first pre-allocated resource;

the processing unit 510 is configured to determine, among the at least one terminal device, a first terminal device; and the processing unit 520 is configured to transmit a first feedback signal to the first terminal device, where the first feedback signal is used for indicating that the terminal device has a successful contention for the first pre-allocated resource.

In an implementation, the processing unit 510 is configured to:

determine, among the at least one terminal device, a second terminal device;

allocate an uplink grant resource to the second terminal device; and the transceiving unit 520 is configured to transmit a second feedback signal to the second terminal device, where the second feedback signal is used for indicating the uplink grant resource.

In an implementation, the processing unit 510 is configured to:

determine, among the at least one terminal device, a first terminal device according to at least one of:

an order in which a sounding signal of the at least one terminal device is being received by the transceiving unit 520; a level of the at least one terminal device; a size of a data amount of the uplink data to be transmitted of the at least one terminal device; and a service type to which the uplink data to be transmitted of the at least one terminal device belongs.

In an implementation, the processing unit 510 is configured to:

determine a terminal device to which the sounding signal belongs according to at least one of: a manner in which the sounding signal is generated and a resource bearing the sounding signal.

In an implementation, the first pre-allocated resource belongs to a first pre-allocated resource group; and the transceiving unit 520 is configured to:

receive a sounding signal sent by at least one terminal device on a resource included in a second pre-allocated resource group.

In an implementation, the processing unit 510 is configured to:

determine the first pre-allocated resource in the first pre-allocated resource group to be a resource that the at least one terminal device contends for according to a resource on which each of the at least one terminal device transmits the sounding signal and a corresponding relationship between resources in the first pre-allocated resource group and the second pre-allocated resource group.

In an implementation, the transceiving unit 520 is configured to:

transmit first indicating information, which is used for indicating allocation information of the second pre-allocated resource.

In an implementation, the allocation information of the second pre-allocated resource is used for indicating at least one of:

a resource location of the second pre-allocated resource;
a mapping relationship between identifier information of a terminal device of a first terminal device set and the second pre-allocated resource;
a transport format of the sounding signal; and
a mapping relationship between a resource in a first pre-allocated resource group and a resource in a second pre-allocated resource group, where the resource in the first pre-allocated resource group is used for transferring uplink data, and the resource in the second pre-allocated resource group is used for transferring a sounding signal.

In an implementation, the sounding signal carries at least one of: a service type of a service to which the uplink data to be transmitted belongs, a data amount of the uplink data to be transmitted, and a part of data of the uplink data to be transmitted.

In an implementation, the transceiving unit 520 is configured to:

transmit second indicating information, which is used for indicating allocation information of the first pre-allocated resource.

In an implementation, the allocation information of the first pre-allocated resource is used for indicating at least one of:

a resource location of the first pre-allocated resource;
a transmission period of the first pre-allocated resource;
a transport format of data transferred on the first lre-allocated resource; and a mapping relationship between identifier information of a terminal device of a first terminal device set and the first pre-allocated resource.

In an implementation, the second indicating information carries a shared identifier, which is used for indicating that the first pre-allocated resource is a resource shared among the first terminal device set.

It should be understood that, the network device 500 may correspond to, and may implement corresponding functions in, the network device in the method 300, which will not be repeated herein for the sake of brevity.

Figure 7:
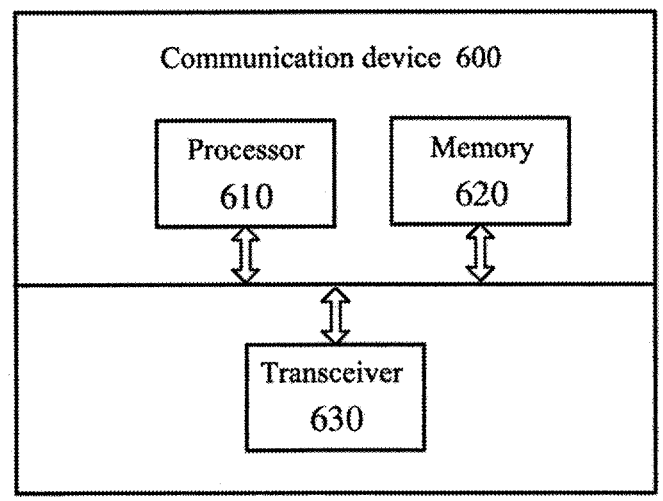
FIG. 7 is a schematic block diagram of a communication device according to an embodiment of the present application.

FIG. 7 is a schematic block diagram of a communication device 600 according to an embodiment of the present application. As shown in FIG. 7, the communication device 600 includes a processor 610 and a memory 620. The memory 620 may store thereon program codes which may be executed by the processor 610.

In an implementation, as shown in FIG. 7, the communication device 600 may include a transceiver 630 which can be controlled by the processor 610 for external communication.

In an implementation, the processor 610 may call program codes stored in the memory 620 to execute corresponding operations for the terminal device in method 200 as shown in FIG. 2, which will not be repeated herein for the sake of brevity.

In an implementation, the processor 610 may call program codes stored in the memory 620 to execute corresponding operations for the network device in method 300 as shown in FIG. 3, which will not be repeated herein for the sake of brevity.

Figure 8:
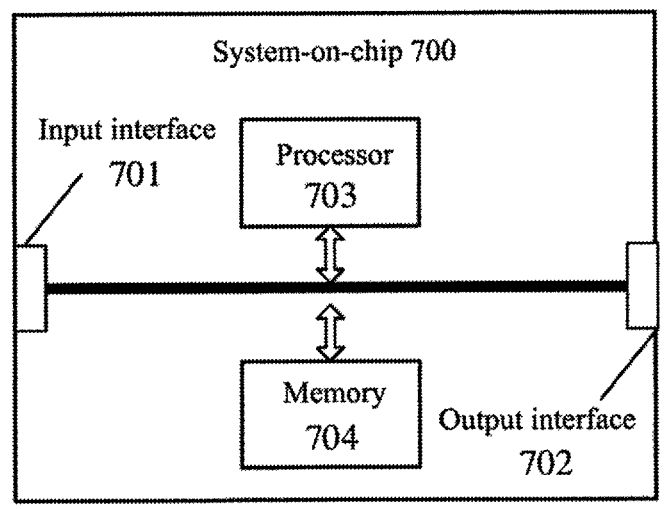
FIG. 8 is a schematic block diagram of a system-on-chip according to an embodiment of the present application.

FIG. 8 is a schematic structural diagram of a system-on-chip 700 according to an embodiment of the present application. The system-on-chip 700 in FIG. 8 includes an input interface 701, an output interface 702, where the processor 703 and the memory 704 are interconnected via a communicative connection, and the processor 703 is used for executing codes in the memory 704.

In an implementation, when the codes are being executed, the processor 703 implements the method to be carried out by the terminal device in method 200 as shown in FIG. 2. For the sake of brevity, no such content will be repeated herein.

In an implementation, when the codes are being executed, the processor 703 implements the method to be carried out by the network device in method 300 as shown in FIG. 3. For the sake of brevity, no such content will be repeated herein.

Those of ordinary skill in the art may realize that, units and algorithm steps that embody various examples as described in the embodiments disclosed herein may be implemented using electronic hardware, or a combination of computer software and electronic hardware. Whether the functions are to be carried out by means of hardware or software would depend on the specific application of the technical solution as design constraints. Those skilled in the art may implement the functions described hereinabove using different approaches for individual applications, but such implementation should not be deemed as beyond the scope of the present application.

Those skilled in the art may clearly appreciate that, for the purpose of convenience and brevity in the description, the specific operating process of the systems, devices and units as described hereinabove may be understood by referring to the corresponding processes in the foregoing method embodiments, which will not be repeated herein.

In the embodiments provided in the present application, it should be understood that the disclosed systems, devices and methods may be implemented by other means. For instance, the apparatus embodiments described above are merely illustrative. For instance, the units are separated by their logical functions only, and other separations are possible in practical implementation. For instance, multiple units or components may be combined, or be integrated with another system, or some features may be omitted or skipped. In addition, the inter-couplings illustrated or discussed, whether a direct coupling or communication connection, may be an indirect coupling or communication connection via some kind of interface, apparatus or unit, and may be electrical, mechanical or otherwise.

The units described as separate components may or may not be physically separated, and the components displayed as a unit may or may not be a physical unit, that is, they may be located at one place, or may be distributed to multiple network elements. Some or all of the units may be selected according to actual needs to achieve the purpose of the solution of the embodiments.

In addition, various functional units in various embodiment of the present application may be integrated into a single processing unit, or be physically separated into standalone units, or two or more units may be integrated into one unit.

When the function is implemented in the form of the software functional unit and traded or used as a standalone product, it may be stored in a computer readable storage medium. Based on such understanding, the essence, or the part contributing to prior art, or part, of the technical solution of the present application may manifest in the form of software product. The computer software product described above may be stored in a storage medium and include instructions for causing a computing device (which may be a personal computer, a server, or a network device, etc.) to implement some or all of the steps in the methods of the various embodiments of the present application. The storage medium includes: a USB flash, a portable hard disk, a read-only memory (ROM), a random access memory (RAM), a magnetic disk, or an optical disk, and the like, which may store program codes.

The above descriptions are merely specific implementations of the present application, and the protection scope of the present application shall by no means be limited thereto. Any one skilled in the art may, within the technical scope disclosed in the present application, readily think of other variations or substitutions, which shall also fall under the protection scope of the present application. Therefore, the protection scope of the present application shall be in accordance with the protection scope of the claims.

What is claimed is:

1. A wireless communication method, comprising:
    transmitting, by a terminal device, a sounding signal to a network device when there is uplink data to be transmitted, wherein the sounding signal is used for contending for a first pre-allocated resource; and
    transmitting, by the terminal device, the uplink data to be transmitted on the first pre-allocated resource, when receiving a first feedback signal sent by the network device in response to the sounding signal, wherein the first feedback signal is used for indicating that the terminal device has a successful contention for the first pre-allocated resource;
    transmitting the uplink data to be transmitted on an uplink grant resource when the terminal device receives a second feedback signal sent by the network device in response to the sounding signal, wherein the second feedback signal is used for indicating the uplink grant resource which is different from the first pre-allocated resource;
    starting a timer after transmitting the sounding signal;
    wherein the transmitting, by the terminal device, the uplink data to be transmitted on the first pre-allocated resource, when receiving a first feedback signal sent by the network device in response to the sounding signal comprises:
    transmitting, by the terminal device, the uplink data to be transmitted on the first pre-allocated resource, when receiving the first feedback signal within a duration of the timer; and
    wherein the transmitting the uplink data to be transmitted on an uplink grant resource when the terminal device receives a second feedback signal sent by the network device in response to the sounding signal comprises:
    transmitting, by the terminal device, the uplink data to be transmitted on the uplink grant resource, when receiving the second feedback signal within the duration of the timer.

2. The method according to claim 1, comprising:
    transmitting a sounding signal on a pre-allocated resource of a next cycle to contend for the first pre-allocated resource of the next cycle, when neither the first feedback signal nor the second feedback signal is received within the duration of the timer.

3. The method according to claim 1, wherein before the transmitting, by a terminal device, a sounding signal to the network device, the method comprises at least one of:
    generating the sounding signal according to identifier information of the terminal device; and
    determining the first pre-allocated resource according to the identifier information of the terminal device.

4. The method according to claim 1, wherein the sounding signal carries at least one of: a service type of a service to which the uplink data to be transmitted belongs, a data amount of the uplink data to be transmitted, and a part of data of the uplink data to be transmitted.

5. The method according to claim 1, comprising:
    receiving second indicating information, which is used for indicting allocation information of the first pre-allocated resource, so as for the terminal device to perform at least one of: transmitting uplink data on the first pre-allocated resource and contending for the first pre-allocated resource according to the second indicating information.

6. The method according to claim 5, wherein the allocation information of the first pre-allocated resource is used for indicating at least one of:
    a resource location of the first pre-allocated resource;
    a transmission period of the first pre-allocated resource;
    a transport format of data transferred on the first pre-allocated resource; and
    a mapping relationship between identifier information of at least one terminal device and the first pre-allocated resource.

7. The method according to claim 5, wherein the second indicating information carries a shared identifier, which is used for indicating that the first pre-allocated resource is a shared resource.

8. The method according to claim 6, wherein the second indicating information carries a shared identifier, which is used for indicating that the first pre-allocated resource is a shared resource.

9. The method according to claim 1, wherein the transmitting, by a terminal device, a sounding signal to a network device comprises:
transmitting, by the terminal device, the sounding signal on a second pre-allocated resource.

10. The method according to claim 9, wherein before the transmitting, by the terminal device, the sounding signal on a second pre-allocated resource, the method comprises:
determining the first pre-allocated resource for transmitting the uplink data to be transmitted among a first pre-allocated resource group; and
determining among the second pre-allocated resource group, by the terminal device, the second pre-allocated resource corresponding to the first pre-allocated resource according to the first pre-allocated resource and a corresponding relationship between resources in the first pre-allocated resource group and resources in a second pre-allocated resource group, which is used for indicating, via the second pre-allocated resource, that a resource to be contended for by the terminal device is the first pre-allocated resource.

11. The method according to claim 9, wherein before the transmitting, by the terminal device, the sounding signal on a second pre-allocated resource, the method comprises:
determining, by the terminal device, the second pre-allocated resource among a second pre-allocated resource group according to identifier information of the terminal device.

12. The method according to claim 9, comprising:
receiving first indicating information, which is used for indicting allocation information of the second pre-allocated resource, so as for the terminal device to transmit the sounding signal on the second pre-allocated resource according to the first indicating information.

13. The method according to claim 12, wherein the allocation information of the second pre-allocated resource is used for indicating at least one of:
a resource location of the second pre-allocated resource;
a mapping relationship between identifier information of at least one terminal device and the second pre-allocated resource;
a transport format of the sounding signal; and
a mapping relationship between a resource in a first pre-allocated resource group and a resource in a second pre-allocated resource group, wherein the resource in the first pre-allocated resource group is used for transferring uplink data, and the resource in the second pre-allocated resource group is used for transferring a sounding signal.

14. A terminal device, comprising a processor, a memory storing instructions, and a transceiver, wherein:
the processor is configured to call the instructions stored in the memory to: generate a sounding signal when there is uplink data to be transmitted, wherein the sounding signal is used for contending for a first pre-allocated resource; and
the transceiver is configured to: transmit the sounding signal; and transmit the uplink data to be transmitted on the first pre-allocated resource when a first feedback signal, which is sent by the network device in response to the sounding signal, is received, wherein the first feedback signal is used for indicating that the terminal device has a successful contention for the first pre-allocated resource;
wherein the transceiver is further configured to: transmit the uplink data to be transmitted on an uplink grant resource when a second feedback signal, which is sent by the network device in response to the sounding signal, is received, wherein the second feedback signal is used for indicating the uplink grant resource which is different from the first pre-allocated resource;
wherein the transceiver is configured to:
start a timer after transmitting the sounding signal;
transmit the uplink data to be transmitted on the first pre-allocated resource when the first feedback signal is received within a duration of the timer;
transmit the uplink data to be transmitted on the uplink grant resource when the second feedback signal is received within the duration of the timer.

15. The terminal device according to claim 14, wherein the transceiver is configured to:
transmit a sounding signal on a pre-allocated resource of a next cycle to contend for the first pre-allocated resource of the next cycle, when neither the first feedback signal nor the second feedback signal is received within the duration of the timer.

16. The terminal device according to claim 14, wherein the processor is configured to perform at least one of:
generating the sounding signal according to identifier information of the terminal device; and
determining the first pre-allocated resource according to the identifier information of the terminal device.

17. The terminal device according to claim 14, wherein the sounding signal carries at least one of: a service type of a service to which the uplink data to be transmitted belongs, a data amount of the uplink data to be transmitted, and a part of data of the uplink data to be transmitted.

18. The terminal device according to claim 14, wherein the transceiver is configured to:
receive second indicating information, which is used for indicting allocation information of the first pre-allocated resource, so as for the terminal device to perform at least one of: transmitting uplink data on the first pre-allocated resource and contending for the first pre-allocated resource, according to the second indicating information.

19. The terminal device according to claim 18, wherein the allocation information of the first pre-allocated resource is used for indicating at least one of:
a resource location of the first pre-allocated resource;
a transmission period of the first pre-allocated resource;
a transport format of data transferred on the first pre-allocated resource; and
a mapping relationship between identifier information of at least one terminal device and the first pre-allocated resource.

20. The terminal device according to claim 18, wherein the second indicating information carries a shared identifier, which is used for indicating that the first pre-allocated resource is a shared resource.

21. The terminal device according to claim 19, wherein the second indicating information carries a shared identifier, which is used for indicating that the first pre-allocated resource is a shared resource.

22. The terminal device according to claim 14, wherein the transceiver is configured to:
transmit the sounding signal on a second pre-allocated resource.

23. The terminal device according to claim 22, wherein the processor is configured to:
determine the first pre-allocated resource for transmitting the uplink data to be transmitted among a first pre-allocated resource group; and determine among the second pre-allocated resource group the second pre-allocated resource corresponding to the first pre-allocated resource according to the first pre-allocated resource and a corresponding relationship between resources in the first pre-allocated resource group and resources in a second pre-allocated resource group, which is used for indicating, via the second pre-allocated resource, that a resource to be contended for by the terminal device is the first pre-allocated resource.

24. The terminal device according to claim 22, wherein the processor is configured to:
determine the second pre-allocated resource among a second pre-allocated resource group according to identifier information of the terminal device.

25. The terminal device according to claim 22, wherein the transceiver is configured to:
receive first indicating information, which is used for indicting allocation information of the second pre-allocated resource, so as for the terminal device to transmit the sounding signal on the second pre-allocated resource according to the first indicating information.

26. The terminal device according to claim 25, wherein the allocation information of the second pre-allocated resource is used for indicating at least one of:
a resource location of the second pre-allocated resource;
a mapping relationship between identifier information of at least one terminal device and the second pre-allocated resource;
a transport format of the sounding signal; and
a mapping relationship between a resource in a first pre-allocated resource group and a resource in a second pre-allocated resource group, wherein the resource in the first pre-allocated resource group is used for transferring uplink data, and the resource in the second pre-allocated resource group is used for transferring a sounding signal.

* * * * *